US008813151B2

(12) United States Patent
Athias

(10) Patent No.: US 8,813,151 B2
(45) Date of Patent: *Aug. 19, 2014

(54) METHOD AND APPARATUS FOR CREATING AND USING VIDEO PLAYLISTS WITHIN A NETWORK

(71) Applicant: Comcast Cable Communications, LLC, Philadelphia, PA (US)

(72) Inventor: Franklyn Athias, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/916,812

(22) Filed: Jun. 13, 2013

(65) Prior Publication Data
US 2013/0347036 A1 Dec. 26, 2013

Related U.S. Application Data

(63) Continuation of application No. 12/272,156, filed on Nov. 17, 2008, now Pat. No. 8,473,993.

(51) Int. Cl.
G06F 3/00 (2006.01)
G06F 13/00 (2006.01)
H04N 5/445 (2011.01)
H04N 7/173 (2011.01)

(52) U.S. Cl.
USPC ............................. 725/110; 725/37; 725/105

(58) Field of Classification Search
USPC .............. 725/37, 38, 58, 86, 87, 91, 105, 110
See application file for complete search history.

(56) References Cited

U.S. PATENT DOCUMENTS

| 5,996,015 A | 11/1999 | Day |
| 7,281,034 B1 | 10/2007 | Eyal |
| 2002/0104099 A1 | 8/2002 | Novak |
| 2004/0117842 A1 | 6/2004 | Karaoguz et al. |
| 2005/0015464 A1 | 1/2005 | Young |
| 2005/0240494 A1 | 10/2005 | Cue |
| 2007/0094690 A1 | 4/2007 | Rodriguez et al. |
| 2008/0147711 A1 | 6/2008 | Spiegelman et al. |
| 2009/0165031 A1 | 6/2009 | Li et al. |
| 2009/0172752 A1 | 7/2009 | Lopatic |
| 2009/0228919 A1 | 9/2009 | Zott et al. |
| 2009/0265742 A1 | 10/2009 | Schwartz et al. |

OTHER PUBLICATIONS

Mar. 3, 2011 Office Action issued in European Patent Application No. 09173259.4.
Kawamoto et al, "On 1st Birthday, iTunes Unwraps New Features," Jan. 1, 2004, XP002996197 URL: http://news.com.com/2103-1027_3-5201599.html?tag=st.util.pring>.
Apr. 27, 2010 Search Report issued in European Application No. 09 17 3259.

Primary Examiner — John Schnurr
(74) Attorney, Agent, or Firm — Banner & Witcoff, Ltd.

(57) ABSTRACT

The invention pertains to a method and apparatus for creating and using video playlists within a network. In accordance with the invention, a user is enabled to create a playlist comprising a plurality of video segments and store the playlist for later access and viewing. In some implementations, the user may upload playlists to the network in order to permit other users to view the playlist and, if desired, watch the playlist's contents. In other implementations, the content provider or third parties may create playlists and make the contents available for viewing. In yet other implementations, the content provider or a third party may insert advertisements into a playlist's contents.

20 Claims, 8 Drawing Sheets

METHOD AND APPARATUS FOR CREATING AND USING VIDEO PLAYLISTS WITHIN A NETWORK

This application is a continuation of U.S. patent application Ser. No. 12/272,156 filed on Nov. 17, 2008 (now U.S. Pat. No. 8,473,993), and titled "Method and Apparatus for Creating and Using Video Playlists within a Network," which is incorporated by reference in its entirety.

BACKGROUND OF THE INVENTION

Field

The invention pertains to the creation and use of video playlists within a network. Originally, television was strictly a broadcast medium. That is, a particular television program was broadcast at a particular time on a particular channel and, if an individual desired to view the program, he or she had to tune to the appropriate channel at the designated time in order to view the program. In or about the early 1980s, the use of videocassette recorders (VCRs) became popular. These devices allowed television viewers to record television programs onto a video cassette tape as they were being broadcast and then watch the television program on tape at any time of their choosing. In order to record television programs using a VCR, the viewer had to know the broadcast time, duration, and broadcast channel of the program ahead of time in order to program the VCR to record the program.

In or about the early 2000s, digital video recorders (DVRs) became popular. "Digital video recorder" (DVR) refers to a device or system that records video in a digital format to a digital storage medium such as a disk drive or solid state memory for future playback. DVRs have different configurations. For example, a DVR may be a stand-alone, modular unit (such as those sold by TiVo), it may be a portable personal device, or it may be incorporated into other audiovisual components such as a set-top box (STB) or the TV itself. It may even be software for a personal computer (PC) that enables the PC to capture video for playback using the digital storage medium of the PC.

These DVRs are designed to interact directly with server-side equipment on the television network to enable users to record television programs for later viewing, similarly to a VCR. However, the ability to interface directly with server-side equipment on the network greatly enhanced usability. For instance, many of these devices permitted users to search an interactive program guide for television programs by name or category, thus relieving the user of the need to know the exact broadcast time and channel in order to record it. Rather, the user could simply find the program by searching for it and then, when located, click a "record" button, without ever having to know anything further about the program.

Around the same time that DVRs were coming into widespread use, another similar service, namely, Video-On-Demand (VOD) was coming into popularity in subscriber-based television networks that even further enhanced the ability of subscribers to view television programs at times of their choosing rather than at the time of a broadcast. VOD is a service offered by many subscription-based television networks that comes in many forms, but generally is a service which permits a subscriber to interact with server-side equipment on the network through manipulation of his or her STB and/or remote control unit, to peruse an interactive program guide that presents a menu of television programs previously recorded by the television network service provider and select from the menu any program the subscriber wishes to view. Upon selection, the server-side equipment transmits the recorded program to the subscriber's STB so that the subscriber may watch the program.

Also in the mid-2000s, it became common for consumers to consume media, including television programs, videos, movies, etc. on computers, mobile telephones, etc. via the Internet or other networks, such as cellular telephone networks. Web sites such as youtube.com and myspace.com offer videos to internet users. Furthermore, various web sites allow users to watch television programs on their computers via streaming over the internet. It also became popular to download content via a network into a memory of a portable device, such as a digital media player, and then view the content from the memory of the portable device without the need for a live connection to any network.

Accordingly, consumers now have many opportunities to watch video and multimedia at a time and place of their choosing. However, little or no attention has been given to enabling consumers of video to organize multiple individual video items into an organized set for viewing. The term "item" as used herein in connection with terms such as video item or multimedia item is used broadly to refer to any portion of video or multimedia. For instance, a video item could be a single episode of a television show, a complete season of a television show, a complete series of a televisions show, a portion of a single episode. It could be any piece of video that could form an item within a video playlist.

SUMMARY OF THE INVENTION

The invention pertains to a method and apparatus for creating and using video playlists within a network. In accordance with the invention, a user is enabled to create a playlist comprising a plurality of video items and store the playlist for later access and viewing. In some implementations, the user may upload playlists to the network in order to permit other users to view the playlist and, if desired, watch the playlist's contents. In other implementations, the content provider or third parties may create playlists and make the contents available for viewing. In yet other implementations, the content provider or a third party may insert advertisements into a playlist's contents.

DETAILED DESCRIPTION OF THE INVENTION

According to one aspect, the present invention pertains to methods and apparatus for permitting consumers of video segments, such as subscribers of a television network or users of websites that offer video segments for viewing to create video playlists and store them for later viewing (by themselves and/or other subscribers of the television network or users of the website). (As used herein, the term "video" is intended to comprise any media that includes at least a video portion, and, therefore, includes multimedia.) According to another aspect, a content provider, such as a television network service provider or website operator, or a third party commercial enterprise may create video playlists and make them available to users for viewing.

In one embodiment of the invention, the playlist comprises an organized collection of pointers to the actual video segments. Thus, when a user chooses to view a playlist, only then are the contents assembled and streamed to the user.

Figure 1:
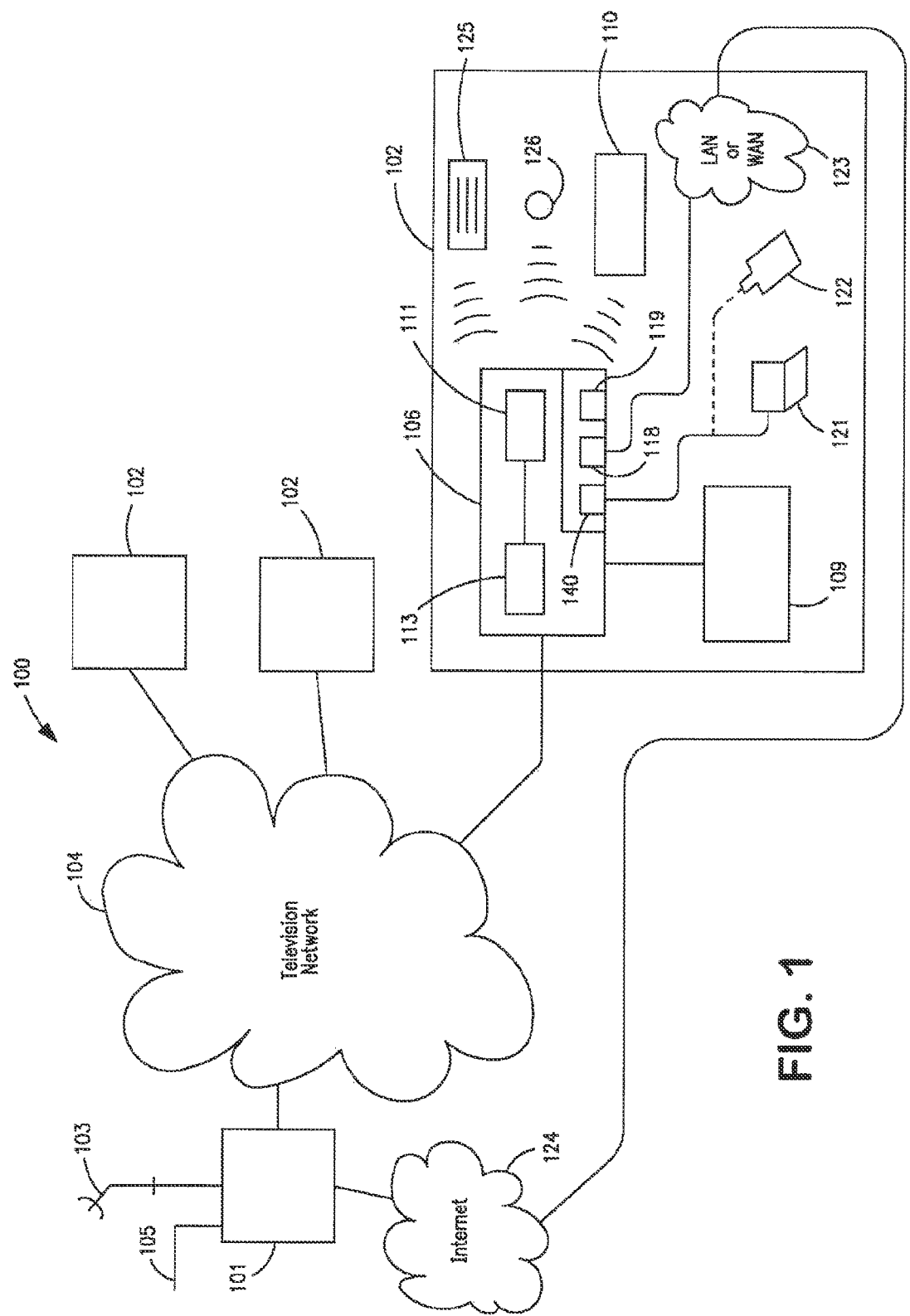
FIG. 1 is a block diagram of the components of an exemplary cable television network system that can support features in accordance with the present invention.

FIG. 1 is a block diagram illustrating a set of components found in a subscription-based television network system 100 in which the present invention can be implemented. It should be understood that the subscription-based television network is merely an exemplary platform for the invention, which can be implemented on other information network platforms, including telephone networks, the Internet, local area networks, wide area networks, etc. "Information network" refers to a collection of devices having a transport mechanism for exchanging information or content between the devices. Such networks may have any suitable architecture, including, for example, client-server, 3-tier architecture, N-tier architecture, distributed objects, loose coupling, or tight coupling.

The television network system 100 includes a headend 101 that receives content that is to be transmitted or distributed (via broadcast, multicast, unicast, switched digital, Video-On-Demand or any other technique) to the user locations 102 of the television network system 100. The term "transmitted" or "transmits" refers broadly to sending a signal from a transmitting device to a receiving device. The signal may be transmitted wirelessly or over a solid medium such as wire or fiber. Furthermore, the signal may be broadcast, multicast/narrowcast, or unicast. Broadcasting refers to the transmission of content to an audience at large. The audience may be the general public, or a sub-audience. Switched digital video is a type of broadcast that is initiated in response to a client request and is terminated when no more clients are tuned to it. Multicasting refers to the simultaneous transmission of content to a plurality of specific and known destinations or addresses in a network or between networks. Multicast is often used for streaming media and Internet television applications, Ethernet multicast addressing, ATM point-to-multipoint VCs and Infiniband multicast. Unicasting refers to the transmission of a signal to a single destination or address in a network. Unicast is used, for example, in Video-On-Demand applications.

The headend 101 receives the content from one or more sources, such as a satellite 103 or a landline 105. The data is modulated at the headend 101 for distribution over the medium of the network 104, e.g., coaxial cable, optical fiber, satellite transmission, cellular wireless communication, etc., to the subscriber locations 102 in homes, cars, businesses, etc. One particular exemplary user location 102 is shown in detail in FIG. 1. Typically, each user has a STB 106 connected to the network at a terminal and in communication with the headend 101 through the network 104.

"Set top box" or STB refers to a device that connects to a monitor and an external source of signal, converting the signal into content for display/transmission over the monitor. The signal source might be an Ethernet cable, a satellite dish, a coaxial cable, a fiber optic cable, a telephone line (including DSL connections), Broadband over Power Line, or even an ordinary antenna. The STB may have several different embodiments. For example, it may be a special digital STB for delivering digital content on TV sets that do not have a built in digital tuner. The STB may also descramble premium channels. A STB may be a cable converter box to receive digital cable TV channels and convert them to analog for non-digital TVs. In the case of direct broadcast satellite (mini-dish) systems such as SES Astra, Dish Network, or DirecTV, the STB is an integrated receiver/decoder (or IRD). In internet packet (IP) TV networks, the STB is a small computer providing two-way communications on an IP network, and decoding the video streaming media which eliminates the need for any coaxial cabling. The STB may be a discrete unit or its functionality may be incorporated into other components of the user's system such as the monitor, TV, DVR, residential gateway, or personal computer. For example, the STB may be a portable, modular unit (i.e., a personal STB) or it may be integrated into a stationary TV system. The STB may contain one or more digital processors or may use the processing capabilities of the other system components (e.g., TV, DVR, personal computer). Additionally, rather than having its own tuner, the STB may use the tuner of a television.

The STB 106 commonly is connected to provide its output to a monitor 109, such as a television set. Commonly, a handheld remote control unit 110 operable by a user communicates wirelessly (e.g., infrared) with the STB 106 to allow a user to control functions and operations of the STB 106 while sitting at a distance from the STB.

The STB 106 is capable of receiving the content signals from the headend 101, permitting the user to select a particular channel for viewing, and demodulating the content on that channel to a form that can be displayed on the user's monitor 109. The STB further may enable access to various channels and other content, such as Video-On-Demand, pay-per-view programs, premium channels, etc., based on permissions granted to each individual user based on his or her subscription plan, parental controls, and other criteria.

The STB 106 can, not only receive data from the headend 101 through the network 104, but also transmit data upstream to the headend 101. For instance, STBs commonly transmit data upstream for purposes of ordering Video-On-Demand content or pay-per-view content or for purposes of participating in enhanced or interactive television services.

The STB 106 includes a processor 113 for running software to provide various functions. It further includes a memory storage device, such as a hard disk drive 111, for recording television programs and/or other content. STBs with this recording capability are commonly referred to as digital video recorder (DVR) set top boxes (STBs) or DVR-STBs. They provide the user the ability to search through upcoming television programming and selectively designate certain programs of the user's choosing to be recorded. The DVR-STB will then automatically tune into those programs when they are broadcast and record them on the hard disk 111. The STB 106 is programmed to provide various graphical user interfaces (GUIs), such as in the form of menu trees, permitting the user to interact with the STB 106 and/or the headend 101 (typically using the remote control unit 110).

The STB 106 preferably further includes one or more input terminals for accepting digital data from external sources in addition to the network 104. This may include, for instance, one or more of a USB terminal 140 for connecting to a personal computer 121 or a USB memory device 122, a computer network cable terminal 118 for connecting to a LAN or WAN 123 (preferably with connectivity to the Internet 124), and a telephone jack 119 for connecting to the Internet via a dial-up or DSL modem and/or a wireless modem. Alternately or additionally, connectivity to the Internet 124 may be provided through the network 104 itself via the headend 101 or other server node.

The STB 106 or other device may be configured with Internet browser software and software for permitting subscribers to interface with the Internet browser software, such as through a keyboard 125 and/or mouse 126.

The STB 106 for purposes of the invention would likely comprise software and/or hardware for performing the functionality described herein for creating and viewing playlists. The headend 101 would likely comprise software and/or hardware for performing the functionality of the headend described herein. The software and/or hardware may comprise any reasonable data processing means, including, but not limited to one or more of a microprocessor, a processor, combinational logic, a state machine, analog circuitry, digital circuitry, an Application Specific Integrated Circuit (ASIC), a Programmable Logic Array (PLA), and software.

The software and/or other circuits may be split between different nodes of the network, such as a server and a client node. Also, the software may be embodied in any form of memory that can be associated with a digital processing apparatus, including, but not limited to RAM, ROM, PROM, EPROM, EEPROM, DRAM, Compact Disc, Tape, Floppy Disc, DVD, SD memory devices, Compact Flash memory devices, USB memory devices, etc.

Referring first to the STB 106 (or any other client node device), an STB in accordance with the present invention may be configured to enable a user operating the STB to create playlists and view the contents of playlists at a time of the user's choosing. Most of the functionality necessary in order to view the contents of playlists already exists in a typical STB for the purpose of viewing recorded programs or Video-On-Demand programs. Such software would merely need to be adapted to handle playlists.

Playlists differ primarily from Video-On-Demand or recorded program viewing by virtue of comprising an ordered list of links to content rather than a single link to a single piece of content. The software and/or hardware adaptations to allow typical DVR-STB to handle a list of links (as opposed to a single link) would be trivial to persons of skill in the art in light of this disclosure and thus does not merit detailed discussion herein. However, it is worthy to note that, in another embodiment of the invention, no adaptation of the STB in order to accommodate a playlist may be necessary at all. For instance, in certain embodiments of the invention, rather than creating a playlist as an ordered list of links to content, upon creation, the playlist content actually may be assembled into a single video segment, which can, of course, thereafter be handled by the STB as a single video segment. Also, as will be discussed below, embodiments are possible in which programming of playlists is handled entirely at a headend or other server-side node and, when a subscriber selects to view a playlist, the headend assembles the playlist contents into a single file and delivers it to subscriber as a single video segment.

With respect to Internet-based embodiments of the invention, conventional Web browsers also already contain most of the software pieces necessary to implement the invention. Any additional software can be provided as an add-on component. The same is true with respect to other client devices such as television-enabled cellular telephones.

Returning to the exemplary embodiment in a subscription-based television network of FIG. 1, with respect to the functionality for purposes of creating a playlist, the STB may be programmed to provide one or more graphical user interfaces (GUIs) and associated functionality that permit the user to interact with the STB to select video segments for inclusion in a playlist in an order of the user's choosing. Such GUIs may take on any reasonable form. In one embodiment of the invention, many of the GUIs might be very similar or identical to GUIs already available for permitting user interaction with Video-On-Demand features or DVR recording features. For instance, a large part of creating a playlist is selecting the content that the playlist is to comprise. Thus, the GUIs and associated functionality used for allowing users to select Video-On-Demand or DVR recorded content can substantially be re-used for selecting content for inclusion in a playlist. The GUIs and/or functionality can be modified so that the selection of a video segment adds it to the playlist rather than causes it to be played immediately by the STB for viewing.

In any event, in one embodiment of the invention, for instance, a user enters the CREATE PLAYLIST feature from an STB main menu GUI (not shown). For instance, a "CREATE PLAYLIST" option can simply be added as one of the options in the STB's main menu.

Figure 2:
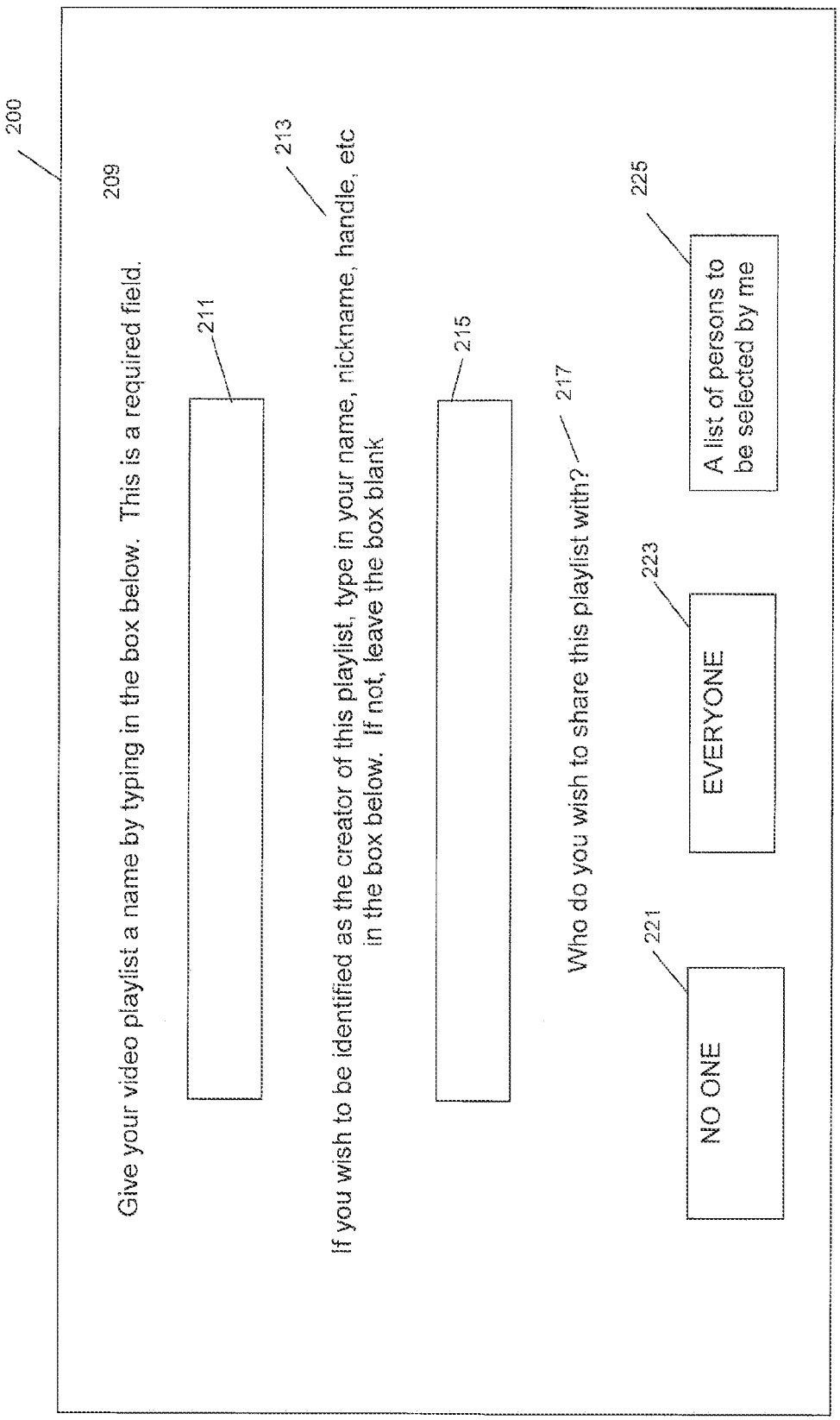
FIGS. 2, 3, and 4 are exemplary user interface screens that can be used in an implementation of the present invention.

Upon selecting the CREATE PLAYLIST option, the user is presented with a first GUI in which the user can commence creating a playlist. FIG. 2 illustrates one possible form for such a GUI. The user may navigate through this and other GUIs and/or enter alphanumeric characters into windows within the GUIs using any reasonable means, including, but not limited to, a keyboard and/or mouse connected to the STB via a wire or wirelessly, an infrared remote unit with navigation buttons and/or alphanumeric keys, a touch screen, etc. As can be seen, the GUI 200 provides some instructions as well as boxes (or windows) within which the user can enter information. For instance, portion 209 of the GUI 200 instructs the user to give the playlist a name by typing it in the window 211.

Next, portion 213 of the screen instructs the user that, if desired, he or she can identify him or herself as the creator of the playlist, if desired, by entering a name, nickname, handle, etc. in box 215, or can leave box 215 blank in order to submit the playlist anonymously. Finally, portion 217 of the GUI asks the user to specify how he or she wishes to share the playlist. Particularly, in this exemplary embodiment, the user is presented with three options namely, (1) a radio button 221, selection of which indicates that the playlist is not to be shared, (2) radio button 223, selection of which indicates that the user wishes to share the playlist universally, e.g., with all subscribers of the television network (or all registered users of a website in an internet-based embodiment), or (3) radio button 225, selection of which indicates that the user wishes to create a list of persons with whom to share the playlist.

Upon selection of one of buttons 221, 223, or 225, the user is directed to a new GUI. If the user selects either radio button 221 or 223, the user is directed, in this example, to GUI 400 shown in FIG. 4. However, if the user selects radio button 225, the user is instead directed to GUI 300 shown in FIG. 3, in which the user enters the identities of the persons with whom he or she wishes to share the playlist.

This may be done in any reasonable way, such as, for instance, entering the e-mail addresses, telephone numbers, STB serial numbers, or the names of those subscribers in a text entry box. The television network operator would be able to identify the subscribers (and the unique identification codes of their STBs) because the television system operator has previously collected such information from its subscribers. The user may simply access a pre-existing group list that he has previously created (e.g., a buddy list). Even further, the television network operator, website operator, network operator, etc. (hereinafter "administrator") may offer to its users predetermined group lists of users with common thematic interests for use in distributing user-created video playlists. For instance, the administrator may permit users to sign up for various group lists, such as Philadelphia Eagles fanatics, "Seinfeld" fanatics, "Monty Python" fanatics, and "Red Dwarf" fanatics and create such group lists from the list of users that sign up for such lists.

Figure 3:
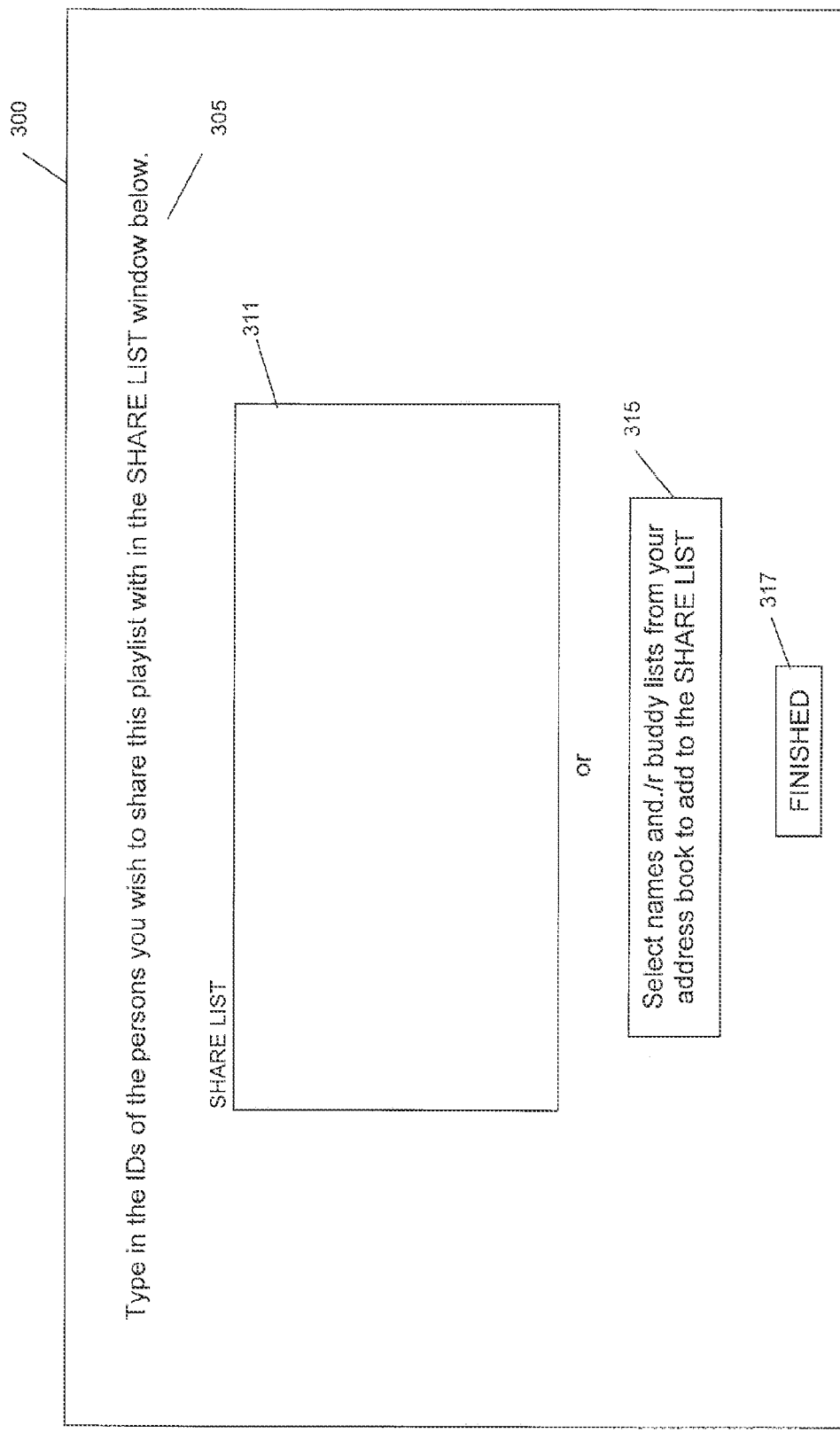

In the exemplary embodiment illustrated in FIG. 3, GUI 300 presents the user with a screen within which the user can enter the identities of the persons with whom he or she wishes to share the playlist. As shown, the user can enter the identities of the persons with whom he or she wishes to share the playlist in the SHARE LIST window 311. Portion 305 of the GUI instructs the user that he or she can enter identities directly in window 311. However, in addition, radio button 315 informs the user that he or she alternately can select names and/or buddy lists from the user's address book into the SHARE LIST window 311. If the user selects button 315, then he or she is directed to another GUI (not shown) showing the user's address book and permitting the user to navigate through the address book to select names or buddy lists for entry into the SHARE LIST.

After the user has entered all of the desired identities into window 311, the user navigates to and selects FINISHED button 317.

Figure 4:
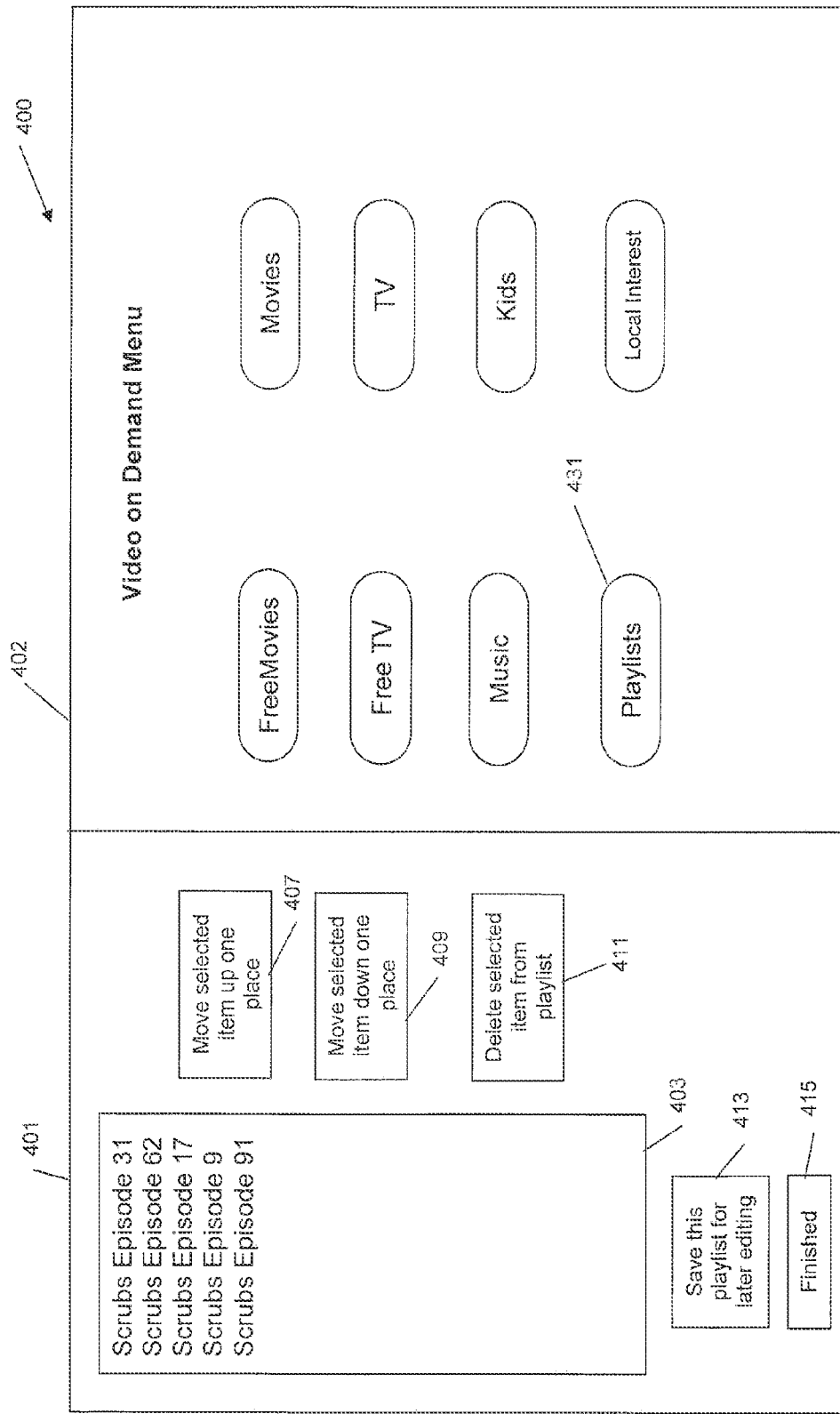

Next, the user is taken to GUI 400 shown in FIG. 4. As noted above, the user also may be directed directly from GUI 200 of FIG. 2 to GUI 400 of FIG. 4 by selecting either of radio buttons 221 or 223, rather than radio button 225 in GUI 200.

In any event, GUI 400 comprises two frames 401 and 402. Frame 401 is the frame within which the user creates the video playlist while frame 402 may, for instance, be the television network service provider's standard Video-On-Demand GUI for allowing subscribers to browse through the Video-On-Demand selections to select one for viewing. However, in this context, the user is selecting video segments to add to the playlist being created in frame 401, and not to view the video segment at that time.

Frame 401 provides a number of buttons for permitting a user to create a playlist and a window 403 for displaying the items in the playlist. In this particular exemplary embodiment, the user can add items to the playlist in window 403 by selecting them from the Video-On-Demand menu in frame 402. Accordingly, for instance, the user can navigate within frame 402 to a program that he or she wishes to record using any conventional GUI navigation technique and then press an "OK" or "Enter" button to select a video segment from the VOD menu. The selected video segment is added to the list in the window 403. The user can do this repeatedly until he or she has inserted all of the desired video segments into the window 403.

Buttons 407-411 provide various functions. For instance, the user may navigate into playlist window 403 and navigate up and down the list of items to highlight one (e.g., by pressing an "OK" or "Enter" button) and then navigate to button 407. By selecting button 407, the highlighted item in the playlist window 403 is moved up one place. Button 409 serves essentially the opposite function, namely, moving a highlighted item in window 403 down one place. Button 411 permits the user to delete a highlighted item in window 403. Furthermore, button 413 allows a user to save the playlist for later editing. In one embodiment of the invention, the playlist is saved on the memory of the local device, e.g., the STB, computer, telephone, etc. Finally, button 415 allows the user to indicate that he or she is finished creating the playlist.

When the user presses button 415, the playlist is created and stored. If the user has chosen not to share the playlist, then the playlist may be stored locally at the user's device, e.g., STB 106, or at a server-side node, e.g., headend 101 of the network (with suitable privacy parameters). On the other hand, if the user has selected to share it with others, in one embodiment, it is uploaded to and stored on a server on the network, e.g., at the headend 101, so that the other users can access it.

If the creator of a playlist specifies a list of others to which the event is to be made available, the administrator may send those users an e-mail through the Internet or a message through a subscriber messaging service of a television network notifying them that they have been invited to view the playlist or actually containing the playlist. The message may disclose who created the playlist.

In some embodiments, users may not be limited to the segments in a VOD menu for inclusion in playlists, but may be allowed to include video segments from other sources. This may include video segments created by the users themselves and uploaded to their personal devices, such as through one of the ports (118, 119, 140) of the STB 106 described in connection with FIG. 1. Specifically, in order to upload video to an STB 106, the STB may have connectively to external data sources, such as the subscriber's personal computer 121, a USB memory device 122, a digital video camera or player, and/or the Internet 124, as previously discussed in connection with FIG. 1. It also may include functionality for the user to interface with the STB, such as the aforementioned remote control unit 111, keyboard 125, and/or mouse 126. Further, the STB 106 may have software for providing functionality for uploading content to the STB, as well as appropriate user interfaces, such as graphical user interfaces (GUIs), and means for interacting therewith. Alternately or additionally, users may be permitted to upload segments to the television network via the Internet 124 (or the television network itself) directly from a separate PC, without using their STB. Then, the user can go to his or her STB to find the video segment just uploaded to the television network and add it to a playlist. In accordance with yet other alternate or additional features, users may be permitted to browse and upload video content from the Internet for inclusion in their playlists.

Of course, in Internet-based embodiments, virtually all of this functionality is already built into a typical Web browser software program and would involve only minimal adaptation to operate in the context of the present invention.

In embodiments of the invention in which users are allowed to include in playlists video segments from a source not under the control of the administrator, then some system may be provided for screening the content of playlists to assure that no offensive or otherwise inappropriate content is included in playlists, e.g., at the headend.

The process of screening playlist content for inappropriate content can take any number of forms. For instance, scanning software is now available that can search text and audio/video content for foul language and/or images, nudity, and other inappropriate content. At this time, such software probably is not sufficiently robust to catch all inappropriate content. Accordingly, human intervention may still likely be desirable (i.e., a human would view the content) not only to assure that it does not contain nudity, profanity, pirated content, etc., but possibly also to assure that it is of sufficient quality to be offered to others.

In one embodiment, the STB, telephone, computer, or other user device further may be configured with multi-media creation software that permits a user to create complex multi-media content directly on the device.

The GUIs shown in FIGS. 2-4 are exemplary and are provided to place the invention in a practical context. The precise form of the user interfaces can be virtually anything that permits a user to access and use the functionality described herein.

At the headend, server, or other administrator node, playlists that are to be shared with other users can be made available for browsing and viewing by users in any reasonable fashion. For instance, playlists may be added to a VOD menu that is already available to users. For instance, a top-level category for "PLAYLISTS" may be added to the VOD menu tree structure (see "Playlists" button 431 in GUI 400 of FIG. 4). The network television service provider may further provide sub-categories under the PLAYLIST category in order to organize the playlists. The subcategories can be organized according to any reasonable ontology, such as by genre (in which case, it may be advisable to provide the user the ability to select a genre from a list of acceptable genres when creating and uploading the playlist). Alternately or additionally, playlists may also be made searchable by the identity of the creator (preferably) with a top-level segregation between playlists created by users versus playlists created by (or for) the administrator.

In one embodiment, the system also allows users to search for playlists by one or more criteria, such as name or identity of the creator, date added, keywords, genre, etc using a search engine.

As mentioned above, in a preferred embodiment, in order to save memory space and minimize network traffic, the playlists themselves actually comprise only links or pointers to video segments. Then, only when a user chooses to view a playlist does the system parse the playlist to identify the memory locations of the individual video segments comprising the playlist and access the actual video segments (stored at the headend, for example) and stream it to the user that selected it. In one embodiment, the entire set of segments comprising the playlist can be assembled and transmitted to the requesting user. In other embodiments, each item can be transmitted when the preceding item ends.

In accordance with another feature of the invention, it may be desirable to store playlists at the server-side node of the network rather than locally on the local STB, even when the user does not wish to share the playlists with anyone. This embodiment allows users to remotely access their playlists more readily from various locations, including cell phones, laptop computers, and STBs of other users, other than merely on the single device on which it was created. Obviously, in such embodiments, some form of security, such as requiring entry of a user name and password, should be used to prevent access by others to restricted playlists.

On the other hand, technologies, such as a "sling box", are presently available that permit a user to access media stored on his or her STB remotely, which would allow a user to access personal playlists without the need to store them at a server node. See for instance, U.S. patent application Ser. No. 12/104,031, incorporated fully herein by reference.

Turning to the server-side software/hardware for implementing the invention, software or hardware may be provided to receive and accept playlists, recognize them as playlists, add them to the Video-On-Demand menu, and/or provide a search function.

Furthermore, in an embodiment that permits users to share playlists with other specified users, the server-side node, e.g., headend 101 or a Web server, also should be configured to accept and recognize such share lists and make such playlists available only to the selected users.

The administrator may wish to add advertisements, recommendations of other playlists or content, or other content directly into playlists, including playlists created by users.

In accordance with an alternate or additional feature, the system may allow users to select video items for inclusion in playlists directly from a program guide. Particularly, many television service providers provide a feature to subscribers in which subscribers can view a program guide that shows all upcoming television programs offered on the network within some specified time period into the future (e.g., two weeks ahead). Thus, the system may also allow subscribers to select such future programs from the program guide. If such future programs are pre-recorded and available, they can be added to the playlist in the same way as any of the aforementioned video segments (e.g., providing a link or pointer to it). On the other hand, for future programs that are not available at the time of the creation of the playlist, this may be handled in several ways, some of which may depend upon managing copyright issues. For instance, in one embodiment, future programs that are not pre-recorded or that the owner simply does not wish to make available for inclusion in playlists until actually broadcast (or ever) may be prohibited from being included in playlists. In other embodiments, a link or pointer may be added to the playlist to a memory location reserved for that future segment (and which will be filled with that future segment when it is broadcast). As an additional feature, prior to the actual availability of the segment, the location pointed to by the pointer may simply contain a substitute video segment listing information about the program (e.g., the name of the program, the date and time of the broadcast, the length of the program, etc.) and a statement that the program is not yet available for viewing.

While the invention has been described in connection with a subscription-based television network embodiment in which server-side functionality in accordance with the invention is provided at a headend 101, it will be readily understood by those skilled in the related arts that this is merely exemplary and that this functionality can be provided at any type of server-side node. For instance, in a cable television system operated by a Multi-System Operator (MSO), the subscriber may be connected to a headend, which, in turn, may be connected to a local operations center, which, in turn, may be connected to a regional operation center, which, in turn, may be connected to a national operations center. The server-side functionality described herein may be embodied in any of these nodes. The term headend as used in this specification is intended to encompass any node of the network that is upstream of the subscribers' STBs.

Also, while client-side functionality and features in the subscription-based television network embodiments have been described in connection with an STB, it should be understood that this is merely exemplary. The client-side node need not be on STB per se. For instance, "smart" televisions have recently become available in which the traditional STB functionality is built directly into the television set thereby eliminating the need for a separate STB.

While the invention has been described in connection with a server-client type of network interaction, it also can be implemented in a peer-to-peer type network arrangement in which there is no server-side node per se and no administrator per se. That is, each client machine can run software that enables peer-to-peer sharing of media segments, much in the nature of the original Napster software for sharing audio content and its many progeny. For instance, U.S. patent application Ser. No. 12/104,031, which is incorporated fully herein by reference, discloses a method and apparatus for peer-to-peer sharing of media and other information between STBs on a network. This includes the ability to search the local playlist libraries of other user's of the peer to peer service and to download the contents of the playlists at the requesting node and/or stream the contents to the requesting node directly from the responding node containing the playlist (and the corresponding contents). The software, of course, also provides the additional functionality described herein for creating the playlists and sharing them as described herein.

FIGS. 5-8 are flow diagrams illustrating operation in accordance with various pieces of the invention according to one exemplary embodiment in which functionality is split between a client-side node and a server-side node. However, it should be understood that this is merely exemplary. As previously mentioned for instance, the software and/or hardware for providing virtually all of the functionality can reside at a server-side node of the network with the client-side node merely adapted to interface with the server-side functionality as needed.

Figure 5:
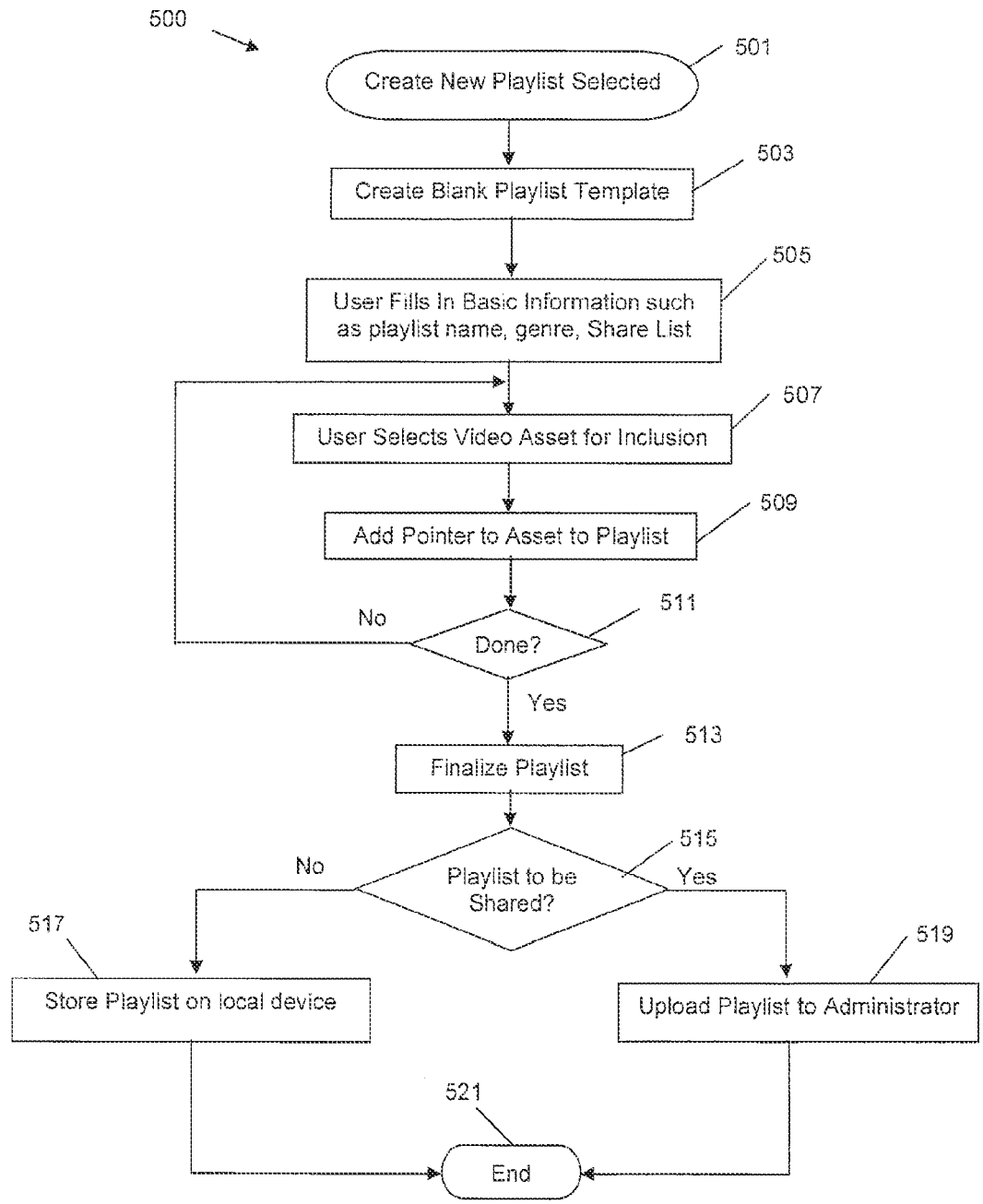
FIG. 5 is a flow diagram illustrating one exemplary process for creating a video playlist at a client-side node, such as an STB, in accordance with the principles of the present invention.
Figure 6:
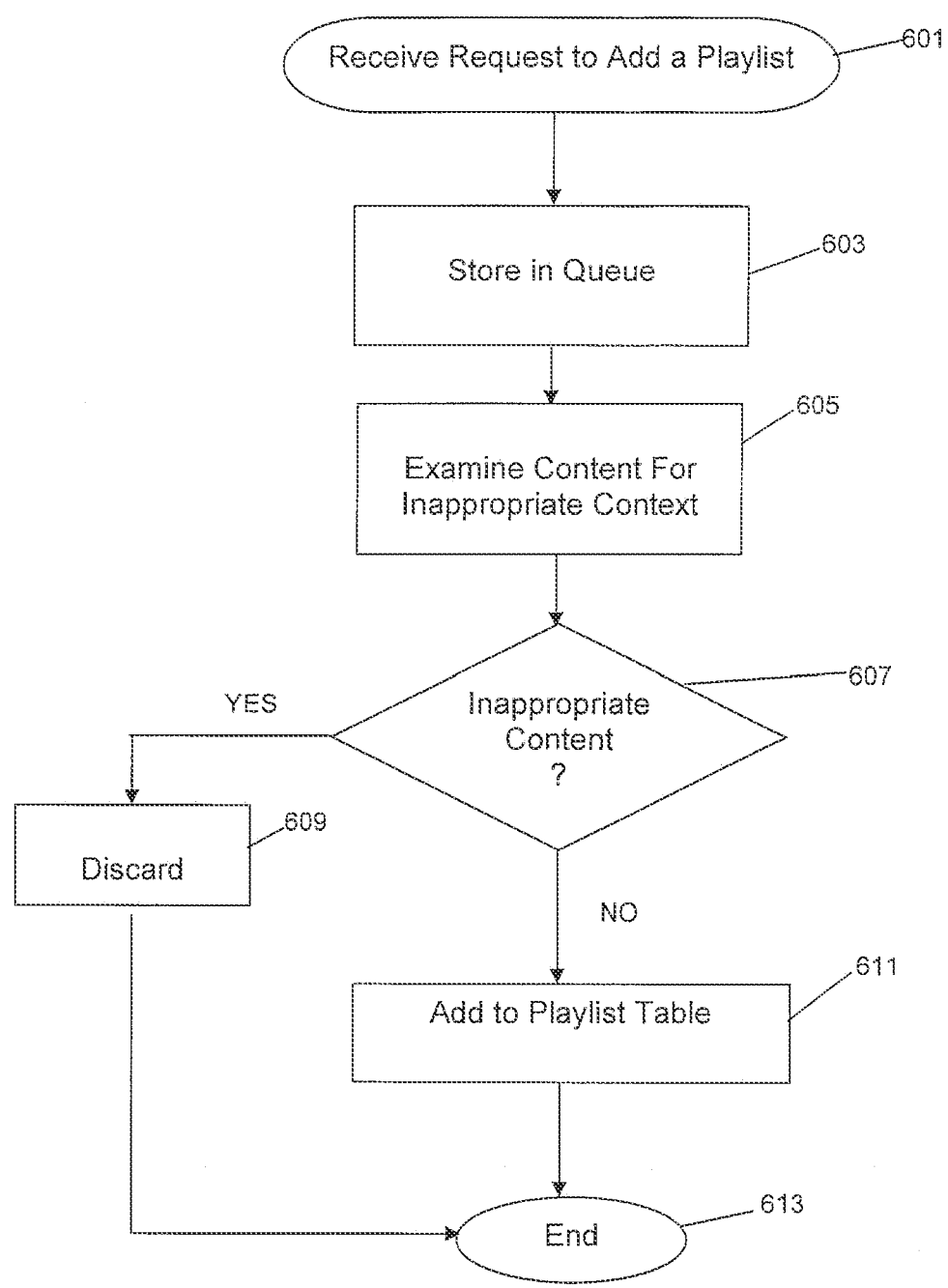
FIG. 6 is a flow diagram illustrating one exemplary process for uploading a video playlist at a server-side node, such as a headend of a subscriber-based television network, in accordance with the principles of the present invention.
Figure 7:
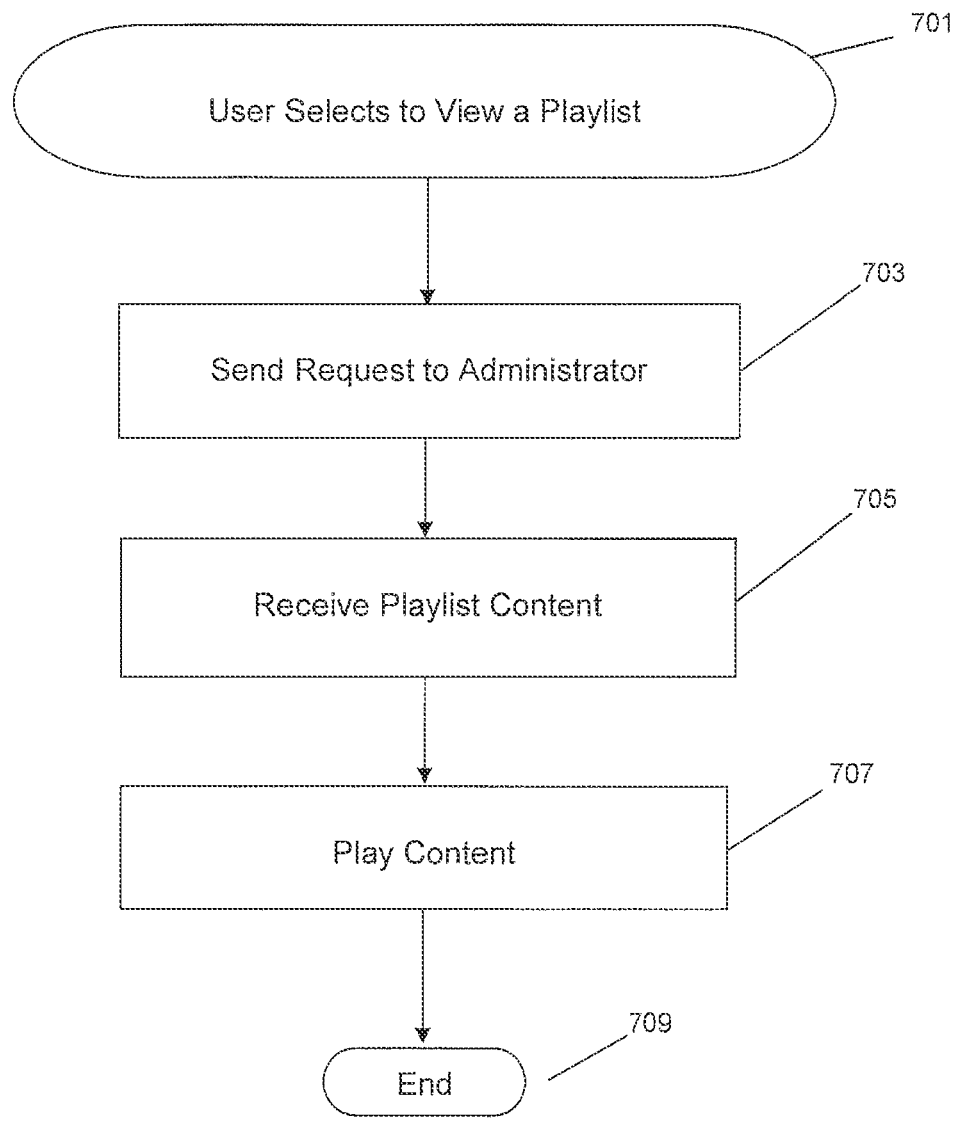
FIG. 7 is a flow diagram illustrating one exemplary process for a client-side device to request from a server-side node a playlist for viewing.
Figure 8:
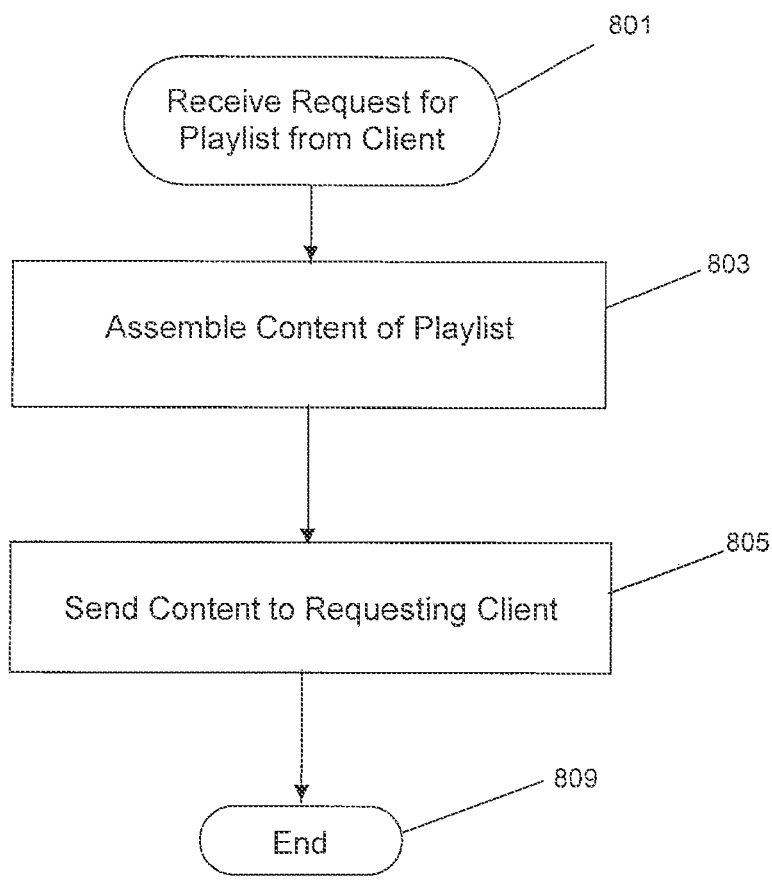
FIG. 8 is a flow diagram illustrating one exemplary process for handling a request for a playlist received from a user.

In any event, FIG. 5 illustrates client-side operation in connection with the creation of a new playlist by a user. FIG. 6 illustrates server-side operation in connection with processing a new playlist received from a user. FIG. 7 illustrates client-side processing in connection with viewing playlist content. Finally, FIG. 8 illustrates server-side processing in connection with sending playlists to requesting user for viewing.

Turning to FIG. 5, the process of creating a new playlist begins, for instance, when a user selects a "Create a New Playlist" option from a menu (step 501). The software for creating a playlist may reside in the users' client-side device, which may be an STB, a computer, a mobile telephone, a PDA (Personal Digital Assistant), a video player, etc. In any event, in step 503, the software creates a blank playlist template to be filled in with information provided by the user. In step 505, the user enters basic information about the playlist such as giving it a name, specifying a genre, specifying persons with which the playlist may be shared, etc. (for instance, as previously described in connection with FIGS. 2 and 3). Next, the user starts selecting video segments to be placed in the playlist (for instance, as previously described above in connection with FIG. 4). Thus, for instance, the user, in step 507, selects a first video segment for inclusion in the playlist. In step 509, the software adds a pointer to the segment to the playlist. In step 511, if the user is not finished creating the playlist, flow proceeds back to step 507 for the addition of the next video segment. After the user has entered all of the desired video segments to the playlist, flow instead proceeds from step 511 to step 513 in which the software finalizes the playlist. In step 515, it is determined if the user indicated whether the playlist is to be shared with any other users or not (e.g., from step 505). If not, flow proceeds to step 517 where the playlist is stored on the client device. On the other hand, if, in step 515, it is determined that the playlist is to be shared with other users, flow instead proceeds from step 515 to 519. In step 519, the playlist is uploaded to a server on the network. The process ends at step 521.

FIG. 6 illustrates flow at the server side in response to receipt of a playlist (e.g., as sent in step 519 of FIG. 5). The process starts at step 601 when a request to add a playlist is received from a user. In step 603, the playlist is stored in a queue. Assuming an embodiment of the invention in which content that is not within the administrator's control can be included in the playlist, flow proceeds to step 605 in which content is examined for inappropriate content. As previously noted, this may include one or both of human examination as well as automated examination. In any event, in step 607, a determination is made as to whether the playlists' content is inappropriate. If it is inappropriate, flow proceeds to step 609 where the playlist is discarded. If, on the other hand, the content contains no unacceptable material, flow instead proceeds from step 607 to step 611, where the playlist is added to a playlist table. The process ends at step 613.

FIG. 7 is a flow diagram illustrating client-side operation when a user chooses to watch a video playlist. The process starts at step 701 when a user selects to view a particular playlist. For purposes of this example, we shall assume that the playlist is not stored locally, but is available from a server-side node. In step 703, the client sends a request to the head-end 101 asking to view the playlist. Next, in step 705, the client receives the playlist contents from the server. In step 707, the client device plays the playlist. The process ends at step 709.

Finally, FIG. 8 is a flow diagram illustrating operation at the server in response to receipt of a request for a playlist for viewing at a client node. The process starts at step 801 when such a request is received over the network (e.g., step 703 in FIG. 7). In step 803, the administrator dissects the playlist, checking each pointer or link, and collects and assembles the contents into a single video segment. (As previously noted, this is merely exemplary and the manner in which the individual video segments comprising the playlist's contents are delivered can take other forms). In step 805, the administrator transmits the playlist content to the requesting client. The process ends at step 807.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method comprising:
   storing, in a network, a playlist comprising a plurality of pointers to a plurality of video segments, wherein the plurality of pointers comprises a pointer to an uploaded video segment from a user of the network and a pointer to a first memory location for a future video segment;
   receiving a selection of the playlist from a requesting user; and
   responsive to receiving the selection of the playlist, transmitting a first of the plurality of video segments to the requesting user.

2. The method of claim 1, wherein the plurality of pointers comprises a pointer to a video segment from content on-demand.

3. The method of claim 2, wherein:
   the uploaded video segment is stored at a second memory location in the network,
   the video segment from content on-demand is stored at a third memory location in the network,
   the pointer to the uploaded video segment identifies the second memory location, and
   the pointer to the video segment from content on-demand identifies the third memory location.

4. The method of claim 3, further comprising:
   parsing the playlist to identify the first, second, and third memory locations; and
   based on the parsing, assembling at least the uploaded video segment and the video segment from content on-demand into a single file,
   wherein the transmitting comprises transmitting the single file to the requesting user.

5. The method of claim 1, wherein a plurality of playlists are stored in the network, the method further comprising:
providing a search engine via the network that enables one or more users to search the plurality of playlists for playlists of interest.

6. The method of claim 5, further comprising:
organizing the plurality of playlists according to an ontology for purposes of enabling ontological searching for playlists.

7. The method of claim 1, further comprising:
causing a user interface to be displayed, wherein the user interface comprises a first field configured to receive an identification of a creator of the playlist and a second field configured to receive an input indicating the playlist is to be shared with one or more users.

8. The method of claim 7, further comprising:
transmitting a message to the one or more users that indicates that the one or more users are invited to select the playlist.

9. The method of claim 1, wherein the future video segment is not currently available and wherein the first memory location is reserved for the future video segment, the method further comprising:
storing, at the first memory location reserved for the future video segment, a substitute video segment comprising information identifying the future video segment.

10. The method of claim 9, wherein the information identifying the future video segment comprises at least one of: (1) a name of the future video segment, (2) a date and time at which the future video segment is scheduled to be transmitted, (3) a length of the future video segment, and (4) a statement that the future video segment is currently unavailable.

11. The method of claim 9, further comprising:
responsive to determining that the future video segment has become available, replacing, at the first memory location, the substitute video segment with the future video segment.

12. An apparatus comprising:
a computing device configured to:
receive a playlist from a client node via a network, wherein the playlist comprises a pointer to an uploaded video segment from a user of the network and a pointer to a first memory location for a future video segment;
receive input from an administrator identifying content to add to the playlist;
add a pointer to the identified content to the playlist;
store the playlist including the added pointer to the identified content;
receive a request for the playlist from a requesting user; and
responsive to the request for the playlist, send the identified content and the uploaded video segment from the user of the network to the requesting user.

13. The apparatus of claim 12, wherein the pointer to the uploaded video segment identifies a second memory location of the uploaded video segment and the pointer to the identified content identifies a third memory location of the identified content, and wherein the computing device is configured to:
responsive to the request for the playlist, retrieve the uploaded video segment from the second memory location and the identified content from the third memory location and assemble the uploaded video segment and the identified content in accordance with an organization of the playlist.

14. The apparatus of claim 12, wherein the computing device is configured to:
examine the uploaded video segment for inappropriate content.

15. The apparatus of claim 12, wherein the future video segment is not currently available and wherein the first memory location is reserved for the future video segment, and wherein the computing device is configured to:
store, at the first memory location reserved for the future video segment, a substitute video segment comprising information identifying the future video segment.

16. The apparatus of claim 15, wherein the computing device is configured to:
responsive to the request for the playlist, assemble the uploaded video segment, the substitute video segment, and the identified content into a single video segment, wherein the sending comprises sending the single video segment to the requesting user.

17. A method comprising:
receiving playlists from client nodes via a network, wherein a first playlist of the playlists comprises a pointer to an uploaded video segment from a user of the network, a pointer to a video segment from content on-demand, and a pointer to a memory location for a future video segment;
receiving input from an administrator identifying content to add to the received playlists;
adding one or more pointers for the identified content to the received playlists;
storing the playlists including the added one or more pointers for the identified content;
permitting users at the client nodes to peruse the playlists;
receiving a request for the first playlist; and
sending segments of video identified by pointers listed in the first playlist to at least one of the client nodes responsive to the request, the segments of video comprising the added content, the uploaded video segment from the user of the network, and the video segment from the content on-demand.

18. The method of claim 17, wherein the first playlist comprises an organized list of pointers to the segments of video listed in the first playlist, the method further comprising:
retrieving the segments of video listed in the first playlist from locations identified in the pointers and assembling the segments of video listed in the first playlist in accordance with the organization of the first playlist.

19. The method of claim 17, further comprising:
organizing the playlists according to an ontology; and
providing a search engine for permitting the users to search the playlists by keywords.

20. The method of claim 17, further comprising:
receiving video segments uploaded from the client nodes that comprise content of the playlists; and
storing the video segments uploaded from the client nodes on the network.

* * * * *

UNITED STATES PATENT AND TRADEMARK OFFICE
CERTIFICATE OF CORRECTION

| | |
|---|---|
| PATENT NO. | : 8,813,151 B2 |
| APPLICATION NO. | : 13/916812 |
| DATED | : August 19, 2014 |
| INVENTOR(S) | : Franklyn Athias |

Page 1 of 1

It is certified that error appears in the above-identified patent and that said Letters Patent is hereby corrected as shown below:

In the Specification

Column 8, Line 28:
    Please delete "111" and insert --110--

Signed and Sealed this
Fourteenth Day of April, 2015

Michelle K. Lee
*Director of the United States Patent and Trademark Office*